(12) United States Patent
Xu et al.

(10) Patent No.: US 11,698,119 B2
(45) Date of Patent: Jul. 11, 2023

(54) DIRECTIONAL VIBRATION CONTROL APPARATUS FOR COMPACTOR DRUM WITH SINGLE ECCENTRIC

(71) Applicant: VOLVO CONSTRUCTION EQUIPMENT AB, Eskilstuna (SE)

(72) Inventors: Hongan Xu, Mechanicsburg, PA (US); Michael MacDonald, Shippensburg, PA (US)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/266,876

(22) PCT Filed: Aug. 10, 2018

(86) PCT No.: PCT/US2018/046234
§ 371 (c)(1),
(2) Date: Feb. 8, 2021

(87) PCT Pub. No.: WO2020/032974
PCT Pub. Date: Feb. 13, 2020

(65) Prior Publication Data
US 2021/0293297 A1 Sep. 23, 2021

(51) Int. Cl.
*F16F 7/104* (2006.01)
*F16F 7/10* (2006.01)

(52) U.S. Cl.
CPC ............ *F16F 7/104* (2013.01); *F16F 7/1017* (2013.01); *F16F 2222/08* (2013.01); *F16F 2224/043* (2013.01)

(58) Field of Classification Search
CPC ...... F16F 7/104; F16F 7/1017; F16F 2222/08; F16F 2224/043
See application file for complete search history.

(56) References Cited

U.S. PATENT DOCUMENTS

| 4,619,552 A | 10/1986 | Sadahiro | |
|---|---|---|---|
| 5,082,396 A * | 1/1992 | Polacek | E01C 19/286 404/127 |

(Continued)

FOREIGN PATENT DOCUMENTS

| CN | 101639109 A | 2/2010 |
|---|---|---|
| CN | 101649595 A | 2/2010 |

(Continued)

OTHER PUBLICATIONS

1st Office Action, Chinese Patent Application No. 201880096457.3, dated Oct. 28, 2021, 18 pages.

(Continued)

*Primary Examiner* — Melody M Burch
(74) *Attorney, Agent, or Firm* — Sage Patent Group

(57) ABSTRACT

A directional vibration control apparatus, which includes a tunable vibration absorber (TVA) for a vibratory compactor machine is provided. The TVA includes a frame mounting structure that is configured to mechanically interface with a frame of the vibratory compactor to provide a fixed attachment of the TVA to the frame of the vibratory compactor, a TVA carrier that extends from the frame mounting structure into an interior portion of a drum of the vibratory compactor machine, a resilient element that includes a first portion that is fixedly attached relative to the TVA carrier and a second portion that includes a degree of freedom of movement relative to the TVA carrier, and a mass that is attached to the second portion of the resilient element and that includes the degree of freedom of movement relative to the TVA carrier.

18 Claims, 11 Drawing Sheets

(56) References Cited

U.S. PATENT DOCUMENTS

| | | | |
|---|---|---|---|
| 5,397,198 A | 3/1995 | Bertrand | |
| 5,573,088 A | 11/1996 | Daniels | |
| 5,695,027 A | 12/1997 | Von Flotow et al. | |
| 5,947,457 A | 9/1999 | Swanson et al. | |
| 6,241,420 B1 * | 6/2001 | Perrin | E01C 19/286 60/494 |
| 6,637,280 B2 * | 10/2003 | Potts | E02D 3/074 74/61 |
| 8,393,825 B2 * | 3/2013 | Marsolek | E01C 19/286 404/117 |
| 2003/0079559 A1 | 5/2003 | Potts | |
| 2003/0118401 A1 | 6/2003 | Magee et al. | |
| 2004/0009039 A1 | 1/2004 | Corcoran et al. | |
| 2005/0147469 A1 | 7/2005 | Miskin | |
| 2014/0001684 A1 * | 1/2014 | Miyata | B62J 1/04 267/132 |
| 2018/0171567 A1 | 6/2018 | MacDonald | |

FOREIGN PATENT DOCUMENTS

| | | |
|---|---|---|
| CN | 102691248 A | 9/2012 |
| CN | 104805757 A | 7/2015 |
| CN | 103835208 B | 2/2016 |
| CN | 206708293 U | 12/2017 |

OTHER PUBLICATIONS

International Search Report and Written Opinion of the International Searching Authority, PCT/US2018/046234, dated Oct. 22, 2018, 9 pages.

Extended European Search Report, European Patent Application No. 18929833.4, dated Apr. 4, 2022, 7 pages.

* cited by examiner

DIRECTIONAL VIBRATION CONTROL APPARATUS FOR COMPACTOR DRUM WITH SINGLE ECCENTRIC

CROSS REFERENCE TO RELATED APPLICATIONS

This application is a 35 U.S.C. § 371 national stage application of PCT International Application No. PCT/US2018/046234 filed on Aug. 10, 2018, the disclosure and content of which is incorporated by reference herein in its entirety.

TECHNICAL FIELD

The present disclosure relates to the field of machines, and more particularly, to machines that are subject to vibration and related assemblies.

BACKGROUND

A variety of machines are subject to significant vibration during operation. Examples of such machines include asphalt and soil compactors. Some machines may use vibration to enhance compaction. For example, a surface compactor having a cylindrical drum may cause the drum to vibrate to enhance compaction of a substrate. Since vibration may be controlled via the operator and may be turned off and on continually throughout a normal work shift, limiting operator vibration exposure may be important when operating such machines. As mentioned, vibration is a common/key component of compaction. Thus, finding ways to reduce transmission of vibration to the rest of the machine and/or reduce the noise may be desirable.

Equipment designers have tried various techniques for reducing vibration and/or noise experienced by the operator. Some previous approaches include using two counterweights rotating so that they offset one another in the horizontal direction but will be additive in the vertical direction. However, such approaches that coordinate two different eccentric weights may be overly complex and/or costly to implement. Some approaches have attempted to reduce the noise by installing sound-absorbing materials around the drum. Such approaches have only yielded limited effectiveness.

Results of such approaches have been insufficient, particularly given the cost of such implementations.

SUMMARY

According to one embodiment, a tunable vibration absorber (TVA) for a vibratory compactor machine is provided. The TVA may include a frame mounting structure that is configured to mechanically interface with a frame of the vibratory compactor to provide a fixed attachment of the TVA to the frame of the vibratory compactor. A TVA carrier may extend from the frame mounting structure into an interior portion of a drum of the vibratory compactor machine. A resilient element includes a first portion that is fixedly attached relative to the TVA carrier and a second portion that includes a degree of freedom of movement relative to the TVA carrier is provided. The TVA includes a mass that is attached to the second portion of the resilient element and that includes the degree of freedom of movement relative to the TVA carrier.

According to an embodiment, an apparatus for a vibratory compactor machine includes a resilient element that includes a first resilient element portion that is fixedly attached relative to a frame of the vibratory compactor and a second resilient element portion that includes a degree of freedom of movement relative to the first resilient element portion, a mass that is attached to the second resilient element portion and that includes the degree of freedom of movement relative to the first resilient element portion, and a mounting component that is configured to position the resilient element and the mass within an interior portion of a drum of the vibratory compactor machine.

ASPECTS

According to one aspect, a tunable vibration absorber (TVA) for a vibratory compactor machine is provided. The apparatus includes a frame mounting structure that is configured to mechanically interface with a frame of the vibratory compactor to provide a fixed attachment of the TVA to the frame of the vibratory compactor, a TVA carrier that extends from the frame mounting structure into an interior portion of a drum of the vibratory compactor machine, a resilient element that includes a first portion that is fixedly attached relative to the TVA carrier and a second portion that includes a degree of freedom of movement relative to the TVA carrier, and a mass that is attached to the second portion of the resilient element and that includes the degree of freedom of movement relative to the TVA carrier.

According to one aspect, the TVA carrier is substantially concentric relative to the drum and wherein the mass is laterally positioned at a center of an axis of the drum.

According to one aspect, the TVA carrier assembly includes an inner cavity that is configured to receive a portion of a vibrating component that is configured to generate vibration of the drum.

According to one aspect, the frame mounting structure includes a removable fastening component that is configured to attach the frame mounting structure to the frame of the vibratory compactor in one of a plurality of radially distinct positions relative to the frame of the vibratory compactor.

According to one aspect, a direction of vibration absorbed corresponds to a direction of the degree of freedom of movement of the mass.

According to one aspect, the resilient element includes leaf spring, the second portion of the resilient element includes a plurality of ends of the leaf spring that are opposite one another, the mass includes first mass that is attached to a first one of the plurality of ends of the leaf spring and a second mass that is attached at a second one of the plurality of ends of the leaf spring. According to one aspect, the first portion of the resilient element comprises a center portion of the leaf spring that is between the plurality of ends of the leaf spring and the leaf spring is attached to the TVA carrier at the center portion of the leaf spring. According to one aspect, the effective stiffness of the leaf spring can be adjustable by varying the mounting location thereof. According to one aspect, the TVA carrier comprises an elongated portion that is configured to extend into the interior portion of the drum of the vibratory compactor machine and that includes an elongated cavity therein and the first portion of the resilient element is attached relative to the TVA carrier within the elongated interior cavity.

According to one aspect, the apparatus further includes a TVA housing that is attached to the TVA carrier to define an interior space that includes the resilient element and mass. According to one aspect, the resilient element comprises a coil spring and the mass is configured to move within the interior space based on the degree of freedom of movement relative to the TVA carrier. According to one aspect, the apparatus includes a fluidic medium that is within the interior space and that tunes the movement of the mass within the interior space based on the viscosity of the fluid.

According to one aspect, a viscosity of the fluidic medium corresponds to a natural frequency that corresponds to an eccentric speed of the vibratory compactor machine. According to one aspect, the fluidic medium comprises an electrorheological fluid that is configured to change viscosity in response to an electric field. According to one aspect, the apparatus includes a fluid reservoir that is configured to store at least a portion of the fluidic medium and a fluid transfer device that is configured to transfer the fluidic medium between the fluid reservoir and the interior of the TVA housing, wherein a natural frequency of the TVA is adjustable based on an amount of the fluidic medium in the interior of the TVA housing.

According to one aspect, the frame mounting structure is configured to support the TVA carrier at a proximal end, the apparatus further comprising a bearing that is configured to support the TVA carrier at a distal end that is opposite the proximal end.

According to one aspect, the resilient element and the mass comprise a natural frequency that corresponds to an eccentric speed of the vibratory compactor machine.

According to one aspect, an apparatus for a vibratory compactor machine is provided. The apparatus includes a resilient element that includes a first resilient element portion that is fixedly attached relative to a frame of the vibratory compactor and a second resilient element portion that includes a degree of freedom of movement relative to the first resilient element portion, a mass that is attached to the second resilient element portion and that includes the degree of freedom of movement relative to the first resilient element portion, and a mounting component that is configured to position the resilient element and the mass within an interior portion of a drum of the vibratory compactor machine.

According to one aspect, the resilient element and the mass are configured to include a natural frequency that is in a frequency range from about 20 Hz to about 80 Hz.

According to one aspect, the apparatus further includes a fluidic medium that is in contact with the mass and that is configured to damp a natural frequency of the mass and resilient element.

According to one aspect, the apparatus further includes a frame mounting structure that includes an adjustment component for adjusting a radial position of the mounting component relative to a frame of the vibratory compactor.

Other dynamic vibration absorbers, rigid bodies, and resilient members according to aspects or embodiments will be or become apparent to those with skill in the art upon review of the following drawings and detailed description. It is intended that all such additional dynamic vibration absorbers, rigid bodies, and resilient members be included within this description and protected by the accompanying claims. Moreover, it is intended that all aspects and embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments. In the drawings.

DETAILED DESCRIPTION

Embodiments will now be described more fully hereinafter with reference to the accompanying drawings, in which examples of embodiments are shown. Embodiments be in many different forms and should not be construed as limited to the embodiments set forth herein. Rather, these embodiments are provided so that this disclosure will be thorough and complete, and will fully convey the scope of present disclosure to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Figure 1:
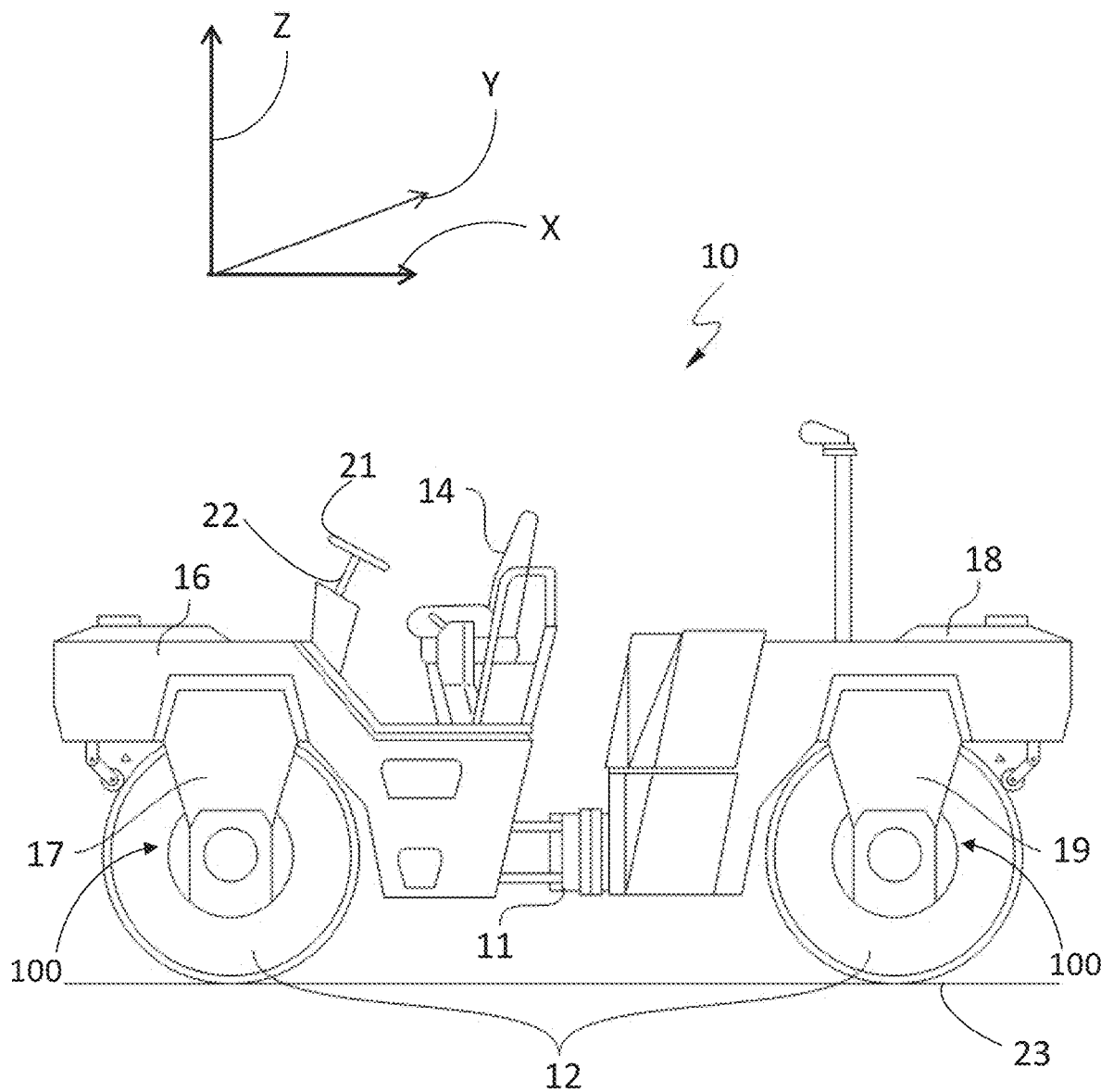
FIG. 1 is a side view of a compaction machine according to some embodiments.

FIG. 1 illustrates a self-propelled roller-type surface compactor machine 10 according to some embodiments. The surface compactor machine 10 can include a chassis 16, 18, rotatable drums 12 at the front and back at of the chassis, and a driver station including a seat 14 and a steering mechanism 21 (e.g., a steering wheel) to provide driver control of the compaction machine. Moreover, each drum may be coupled to the chassis 16, 18 using a respective yoke 17, 19. One or both of the drums 12 may be driven by a drive motor in the chassis under control of the driver to propel the surface compactor machine 10. An articulable coupling 11 may be provided in the chassis to facilitate steering about a vertical axis. The drums 12 have a cylindrical outer surface that forms a compacting surface for compacting an underlying substrate 23, such as asphalt, gravel, soil, etc. One or both of the drums 12 may generate vibration forces that assist with compaction of the substrate. The surface compactor machine 10 includes a steering wheel 21 or similar device for receiving operator input to control the direction of travel of the surface compactor machine 10. The steering wheel 21 may be coupled to the surface compactor machine 10 via a steering column 22. The steering column 22 includes a proximal end that is coupled to the surface compaction machine 10 and a distal end that is opposite the proximal end and that is coupled to the steering wheel 21.

Figure 2:
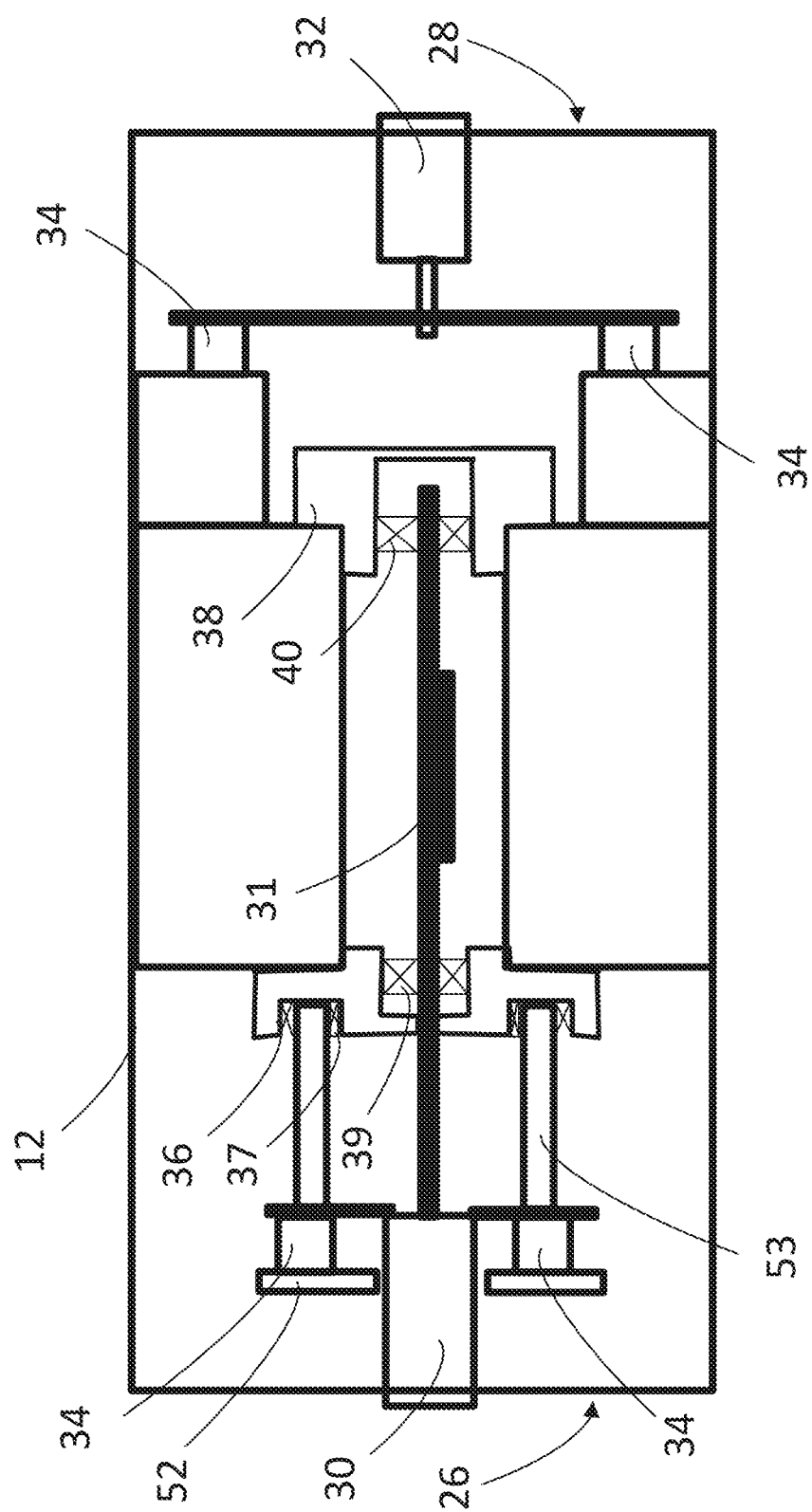
FIG. 2 is a cross-sectional schematic front view of a conventional drum in a compaction machine.

Brief reference is now made to FIG. 2, which is a cross-sectional schematic front view of a drum 12 in a compaction machine 10. The drum 12 is driven by a drive motor 32 that is attached to the frame of the compactor and that is configured to rotate the drum 12 relative to the frame for propulsion. A vibration motor 30 may be attached to components that vibrate with the drum. For example, a vibratory shaft 31 that is driven by the vibration motor 30 includes an eccentric weight that, when rotated, induces vibration of the drum 12. A drum drive side journal 38 may provide a rotatable coupling between the drum 12 and the vibratory shaft 31 via bearings 40.

A vibration motor side journal 36 may provide a rotatable coupling between the drum 12 and a frame portion 53 that is attached to the frame 52 of the compactor 10 via bearing 37. The vibration motor drive side journal 36 may further provide a rotatable coupling between the drum 12 and the vibratory shaft 31 via bearings 39. Different structural components may be isolated from one by isolators 34 that may include a rubber or other compressible material that may inhibit the transfer of vibration from one component to another component.

Despite the use of isolators, the surface compactor machine 10 may generate significant vibration in general. Such vibration may, for example, result in premature wear and increased maintenance to the machine or be transmitted to the steering wheel 21 via the steering column 22. In this regard, during normal use and operation, the operator may experience undesirably high levels of vibration through the steering wheel 21 as well as through the set and floor of the surface compactor machine 10. Advantageously, the surface compaction machine includes a directional vibration control apparatus, which is primarily comprised of a tunable vibration absorber ("TVA"). A TVA 100 as described herein may be attached to the frame proximate to the front and/or rear drums 12. For example, a TVA 100 may be provided for each of the front and rear drums 12 or just one of the front or rear drums 12. In some embodiments, the term attached may include any mechanical fastening device, bonding or other mechanism that secures the TVA 100 to the frame in a manner such that neither the TVA 100 nor the frame are movable relative to one another.

One aspect of an embodiment disclosed herein is directed to a tunable vibration absorber ("TVA") that is tunable to use across one or more machine platforms that include multiple machine types and/or configurations. In use and operation, the TVA 100 may significantly reduce the sound and vibration corresponding to vibration components that are generated by the vibratory drum. Vibration may generally be expressed as the acceleration of a vibrating component, which is a measure of how quickly the velocity of the component is changing. Acceleration may be measured and expressed as magnitudes corresponding to different axes. For example, the X, Y and Z axes in a Cartesian coordinate system may be used to provide 3 orthogonal axes along which to measure the vibration. In measuring the vibration, accelerometers corresponding to each of the X, Y, and Z axes may be used. Although the X, Y, and Z axes are illustrated as generally corresponding to the surface compactor machine 10, such arrangement is substantially arbitrary as the X, Y, and Z axes could be oriented to correspond any other components.

Figure 3:
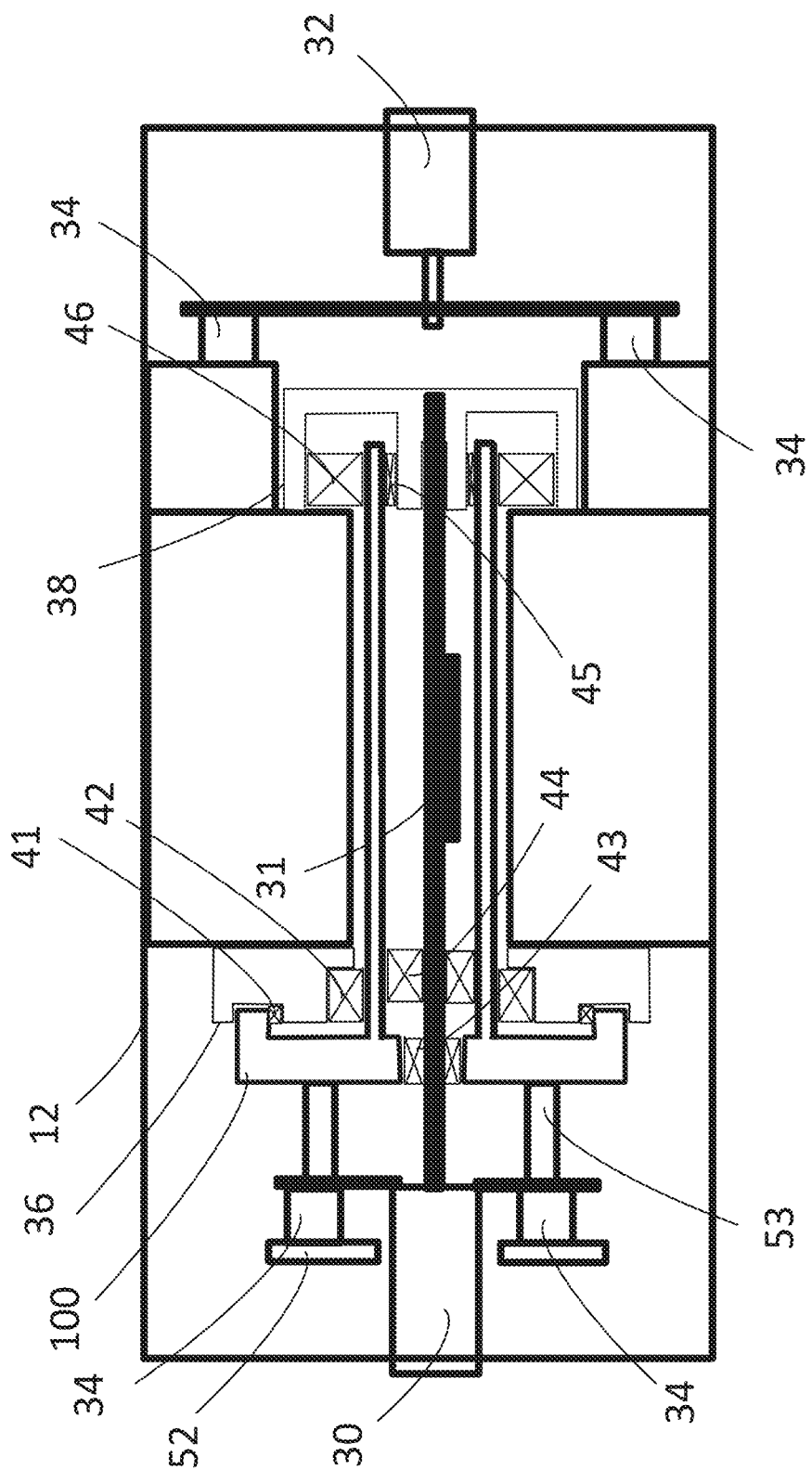
FIG. 3 is a cross-sectional schematic front view of a drum in a compaction machine that includes a tunable vibration absorber according to some embodiments.

Reference is now made to FIG. 3, which is a cross-sectional schematic front view of a drum in a compaction machine that includes a tunable vibration absorber according to some embodiments. Discussion of elements in FIG. 3 that are discussed above regarding FIG. 2 may be omitted for brevity. A TVA 100 as disclosed herein may be applied and/or attached to the frame 52 and/or frame portion 53 in a configuration that positions a vibration absorbing portion of the TVA 100 within a cavity defined by the drum 12. The attachment of the TVA 100 to the frame 52 and/or frame portion 53 may be significant in that the TVA 100 absorbs vibrations that may otherwise be transmitted to the frame due to rotation of the eccentric system and the generation of impact vibrations. One aspect of an embodiment herein provides that vibration absorbing portion may be located in the cavity at or proximate the lateral center of the drum.

Figure 4A:
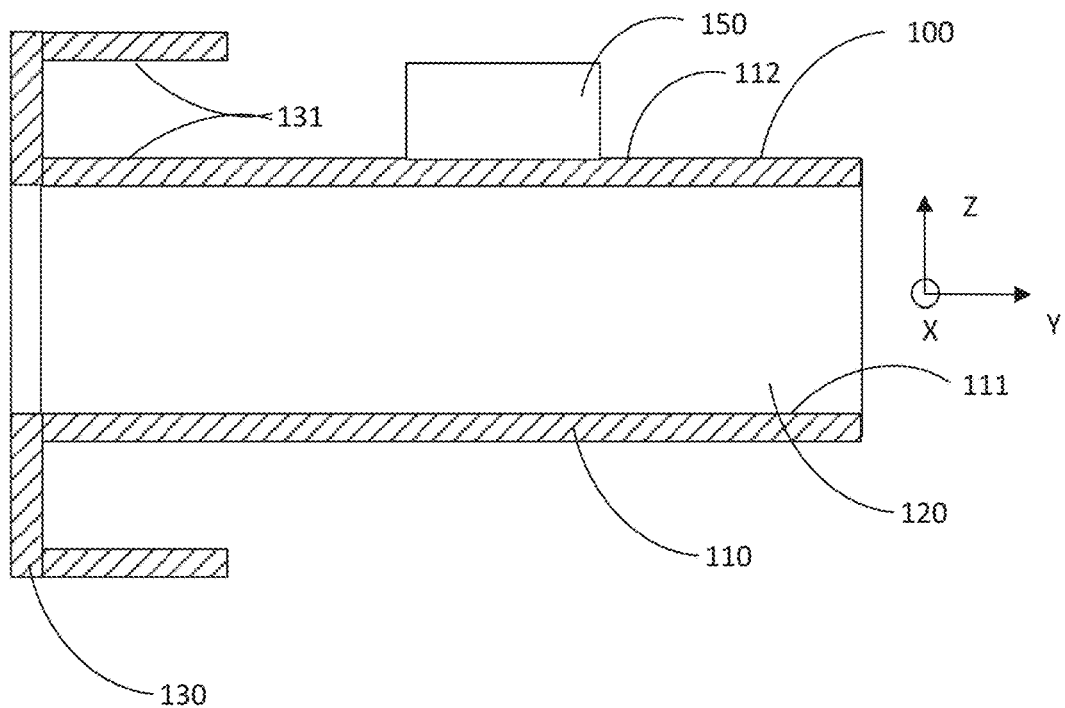
FIGS. 4A and 4B are cross-sectional schematic front views of a tunable vibration absorber according to some embodiments.
Figure 4B:
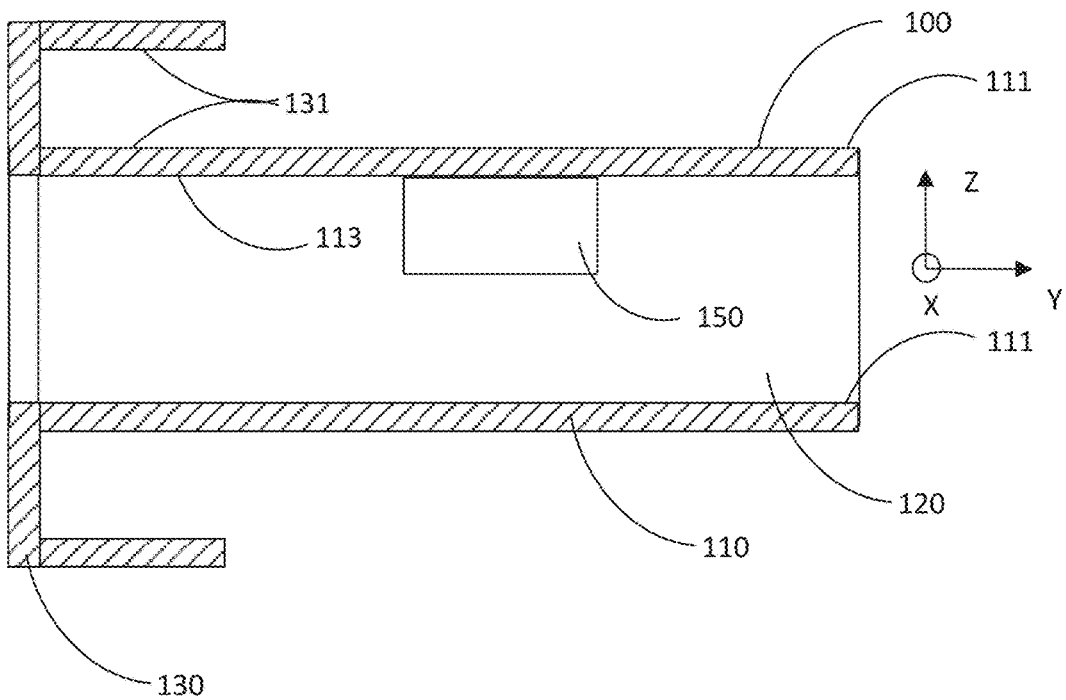

The TVA 100 includes a seismic mass component and a resilient member that may resiliently support the mass component within the drum 12. By selecting the stiffness of the resilient element and the shape, size and/or location and quantity of the suspended mass, the TVA 100 may be able to absorb vibratory energy at a targeted frequency and/or frequency range or band. Additionally, arrangement and/or design of the resilient member may be used to target selected vibration frequencies and/or frequency components. According to one aspect of the present embodiment, the seismic mass component engages and is supported by the resilient element and includes a primary direction of freedom of axial movement relative to the drum 12, which determines which directions of vibration will be reduced by the TVA 100. Thus, by altering the radial position of the TVA 100 relative to the frame 52, the TVA 100 may be configured to specifically absorb vibration primarily in a particular axial direction at a given magnitude. For example, FIGS. 4A and 4B illustrate the vibration absorber component 150 at different axial positions. For convenience, the directional components of vibration may be referred to herein using X, Y and Z axes in a Cartesian coordinate system, as shown in FIGS. 1, 4A and 4B.

Various aspects of the TVA 100 are described herein by way of non-limiting examples in the context of the roller-type surface compactor machine 10. It is to be understood that the embodiments are not limited to the particular configurations disclosed herein and may furthermore be used with other types of machines that generate and/or translate vibration and/or corresponding sound. The figures are not necessarily provided to scale, but instead, dimensions may be exaggerated to better illustrate embodiments including elements of the TVA 100.

One aspect of an embodiment herein provides that a TVA 100 may be attached in a rotationally fixed arrangement relative to the frame 52 at the vibration motor drive side 26 of the drum 12 that is opposite the drum drive motor side 28 of the drum 12. In one aspect of an embodiment, the TVA 100 may be attached at the vibration motor drive side 26 of the drum 12 and extend into the cavity defined by the drum 12. The vibration motor drive side 26 may include a journal 36 that provides rotatable coupling between the TVA 100 and the drum 12 and/or the vibratory shaft 31 using bearings 41, 42, 43 and 44.

One aspect of an embodiment provides that the TVA 100 may be rotatably coupled to the drum 12 and/or the vibratory shaft 31 using a drum drive side journal 38 via bearing 45 and 46. Thus, the TVA 100 may be fixed relative to the frame 52 and movable relative to the drum 12 and the vibratory shaft 31. In an aspect, the drum 12 may rotate relative to the frame 52 and the TVA 100 during operation.

Reference is now made to FIGS. 4A and 4B, which are cross-sectional schematic front views of a tunable vibration absorber according to some embodiments. Referring to FIG. 4A, the TVA 100 includes a mounting structure 130 that is configured to mechanically interface with the vibratory compactor frame 52 and/or a portion thereof to provide a fixed attachment of the TVA 100 to the frame of the vibratory compactor 10. In one aspect, the mounting structure 130 may absorb vibration that is transmitted from the eccentric system to the frame. The mounting may be accomplished in a variety of ways including via reusable and/or single use mechanical fasteners and/or chemical or metallic bonding such as welding and/or brazing, among others. In this one embodiment, by way of example and not limited thereto, the TVA 100 is mounted as illustrated. In one aspect of an embodiment, the mounting structure may be a frame mounting structure that provides a fixed attachment of the TVA 100 to the frame 52. One aspect of an embodiment provides that the mounting structure 130 may be attached in a manner that is not rotatable relative to the frame 52. Additionally, the fixed position of the mounting structure 130 and thus the TVA 100 may be provided at different rotary positions relative to the frame 52. The TVA 100 may be attached to the frame in any one of the different rotary positions to target different vibration directions X, Y, Z. The different rotary positions may provide adjustment regarding which direction of vibration is to be absorbed.

One aspect of an embodiment provides that the mounting structure 130 may include one or more rotary coupling surfaces 131 that are configured to provide a rotary coupling with one or more other surfaces in the drum 12 that are operable to rotate relative to the mounting structure 130 via journals and/or bearings, for example.

The TVA 100 may include a TVA carrier 110 that is configured to extend within an interior portion of the drum 12 from the mounting structure 130 at one end of the drum 12 to the other end of the drum 12. The TVA carrier 110 is configured to support the vibration absorber component 150 at a position that is within the interior portion of the drum 12. One aspect of an embodiment provides that the vibration absorber component 150 is positioned at or near the lateral center of the drum 12. For example, the lateral center may provide that the vibration absorber 150 is about at the center between the left edge of the drum 12 and the right edge of the drum 12.

Although some embodiments provide that the TVA carrier 110 is a hollow cylinder that includes an interior portion 120, such embodiments are non-limiting. For example, the TVA carrier 110 may be fully or partially solid and/or filled. Additionally, the TVA carrier 110 may have a cross-sectional geometry other than round. For example, the TVA carrier 110 may be planar, arcuate and/or polygonal, among others. The TVA carrier 110 may include one or more rotary coupling surfaces 111 that are configured to provide a rotary coupling with one or more other surfaces in the drum 12 that are operable to rotate relative to the mounting structure 130 via journals and/or bearings. In this manner, the TVA carrier 110 may be able to rotatably move relative to the other surfaces in the drum 12, for example.

The vibration absorber component 150 may be attached to an outside surface 111 of the TVA carrier 110. However, such embodiments are non-limiting. For example, brief reference is made to FIG. 4B, which illustrates that the vibration absorber component 150 may be attached to an inner surface 113 of the TVA carrier 110. Although the lateral position of the vibration absorber component 150 may substantially affect the components of vibration absorption, the axial distance from a center of the TVA carrier 110 may not affect the performance of the vibration absorber component 150.

Figure 5:
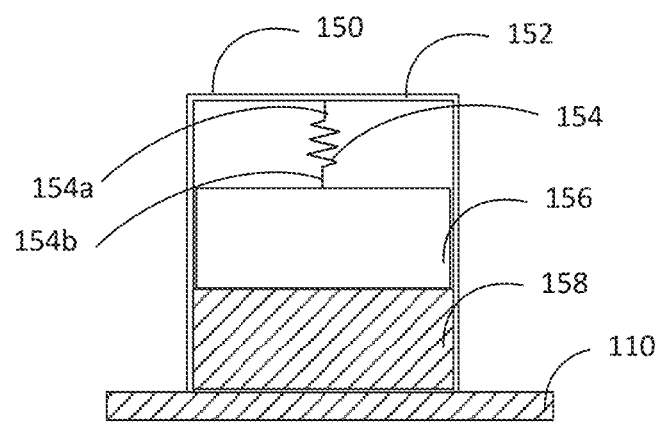
FIG. 5 is a cross-sectional schematic view of a vibration absorbing component of a tunable vibration absorber according to some embodiments.

Reference is now made to FIG. 5, which is a cross-sectional schematic view of a vibration absorbing component of a tunable vibration absorber according to some embodiments. In one aspect of an embodiment, the vibration absorbing component 150 may include a resilient element 154 that includes a first portion 154a that is fixedly attached relative to the TVA carrier 110 and a second portion 154b that includes a degree of freedom of movement relative to the TVA carrier 110. In one aspect of an embodiment, the resilient element 154 may be a biasing element such as, for example, a spring including one or more spring elements.

The vibration absorbing component 150 may include a mass 156 that is attached to the second portion 154b of the resilient element 154. The mass 156 may be referred to as a seismic mass in that inertia of the mass deforms the resilient element 154 during acceleration that may occur due to vibration.

By virtue of engagement with the TVA carrier 110 through the resilient element 154, the mass 156 is allowed to move relative to the TVA carrier 110 to attenuate vibrations with different frequency components. The size and/or spring constant of the resilient element 154 and the seismic mass 156 may be varied to tune the TVA 100 to dominant target frequencies. For example, the effective stiffness of a given spring material may be varied by adjusting the resilient member size and/or shape. In this manner, vibrations of a TVA carrier 110 in a direction that corresponds to the degree of freedom of movement relative to the TVA carrier 110 may be targeted for absorption by the TVA 100 corresponding to the different vibration directions X, Y, Z, as illustrated in FIGS. 4A and 4B.

In an aspect of an embodiment, the vibration absorbing component 150 may include a vibration absorbing component housing 152. The vibration absorbing component housing 152 may be attached to the TVA carrier 110 and may define an interior space that includes the resilient element 154 and the mass 156. The vibration absorbing component housing 152 may provide an attachment point for the first portion 154a of the resilient element to be attached.

In one aspect of an embodiment, the vibration absorbing component housing 152 may contain, within the interior space, a fluidic medium 158 that tunes the movement of the mass within the interior space. The viscosity of the fluidic medium 158 may be correspond to a natural frequency of the resilient element 154 and the mass 156 that corresponds to an eccentric speed of the vibratory compactor machine. In one aspect of an embodiment, the fluidic medium 158 includes an electrorheological fluid that is configured to change viscosity in response to an electric field. For example, the value of a voltage across the fluidic medium 158 may determine the viscosity properties thereof. Other types of fluidic mediums 158 may be used including petroleum based and/or synthetic oils and/or fluids. In an aspect of an embodiment, air springs and/or an electromagnetic device may be used for tuning the movement of the mass 156.

In one aspect of the embodiment, a fluid reservoir may store a portion of the fluidic medium that may be transferred by a fluid transfer device to and from the interior of the vibration absorbing component housing 152. In such aspects, the natural frequency of the resilient element 154 and mass 156 may be adjusted based on an amount of the fluidic medium in the interior of the vibration absorbing component housing 152.

Figure 6:
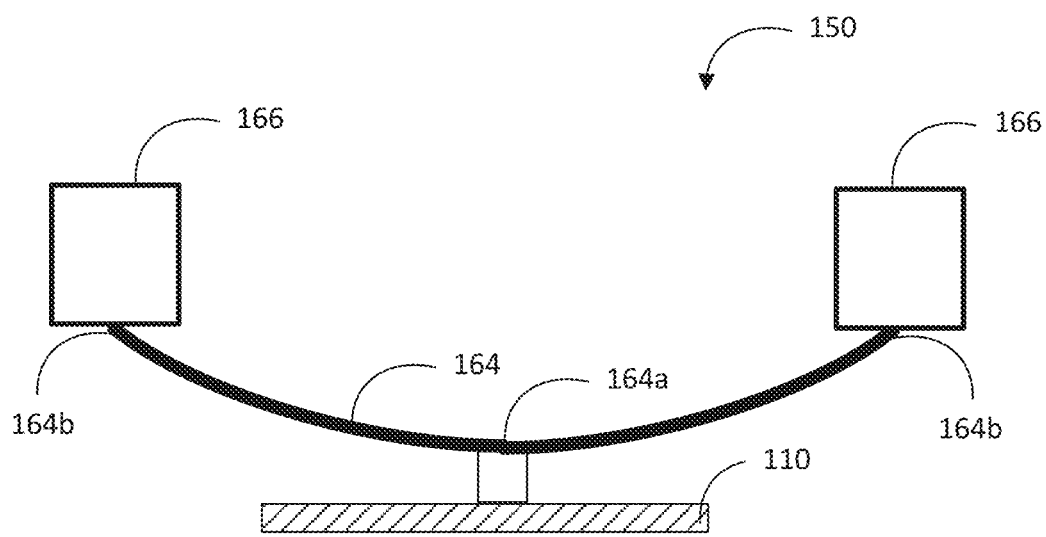
FIG. 6 is a cross-sectional schematic view of a vibration absorbing component of a tunable vibration absorber according to some embodiments.

Although the resilient element 154 is illustrated in FIG. 5 as a coil spring, the disclosure is not so limited. For example, brief reference is now made to FIG. 6, which is a cross-sectional schematic view of a vibration absorbing element of a tunable vibration absorber according to some embodiments. In one aspect of an embodiment, the vibration absorbing component 150 includes a leaf spring 164 as the resilient element. The leaf spring 164 may include a first portion 164a that is fixedly attached relative to the TVA carrier 110 and one or more second portions 164b that each include a degree of freedom of movement relative to the TVA carrier 110. The vibration absorbing component 150 may include one of more masses 166 that are attached to the second portions 164b. As discussed above regarding FIGS. 4A and 4B, the vibration absorbing component 150 mounted on an exterior surface of the TVA carrier 110 or within a cavity that is defined by the TVA carrier 110.

Figure 7:
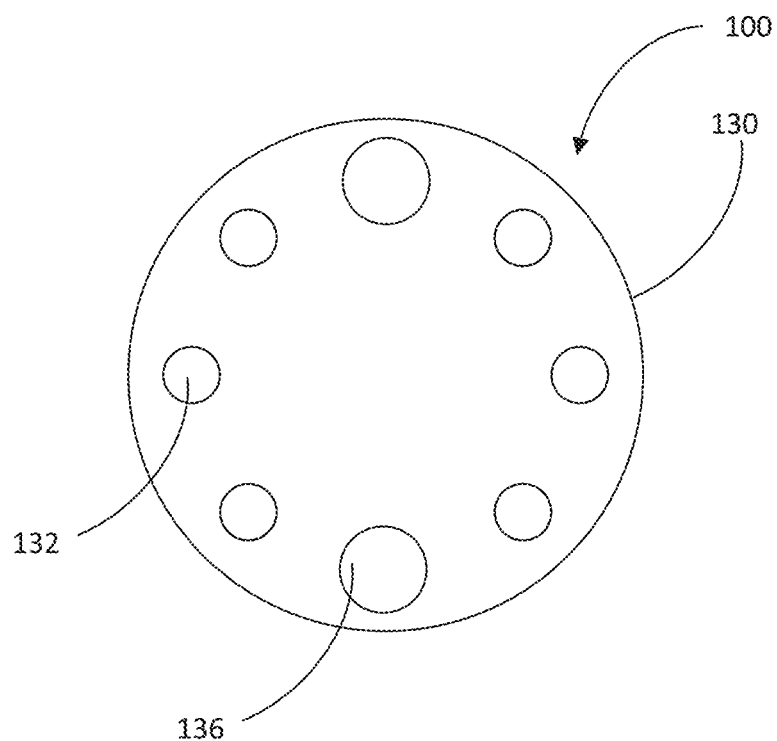
FIG. 7 is a side schematic view of a tunable dynamic vibration absorber according to some embodiments.

Reference is now made to FIG. 7, which is a side schematic view of a tunable dynamic vibration absorber according to some embodiments. As illustrated, the side view of the TVA 100 includes the outer portion of the mounting structure 130. The mounting structure 130 is configured to mechanically interface with the vibratory compactor frame 52 and/or a portion thereof to provide a fixed attachment of the TVA 100 to the frame of the vibratory compactor 10. Once attached, the mounting structure 130 is not rotatable relative to the frame 52. As discussed above, the TVA 100 may be provided at different fixed rotary positions relative to the frame 52 by selecting different ones of the mounting structures 132. For example, as illustrated, the mounting structures 132 may be provided as different holes that may be selectively used to determine the fixed axial position of the TVA 100. For example, as illustrated, the TVA 100 may be mounted at eight different axial positions that are about 45 degrees apart from one another. The different rotary positions may provide adjustment regarding which direction of vibration is to be absorbed.

Based on the illustration of FIG. 7, an aspect of the embodiments may provide mounting structures 132 that are spaced apart to provide multiple different discrete axial positions. For example, as illustrated, the TVA 100 may be mounted at eight different axial positions that are about 45 degrees apart from one another. In this manner, different holes may be selectively used to determine the axial position of the TVA 100. Aspects are not so limited as more or less than eight different axial positions may be provided by different mounting structures 132.

Figure 8:
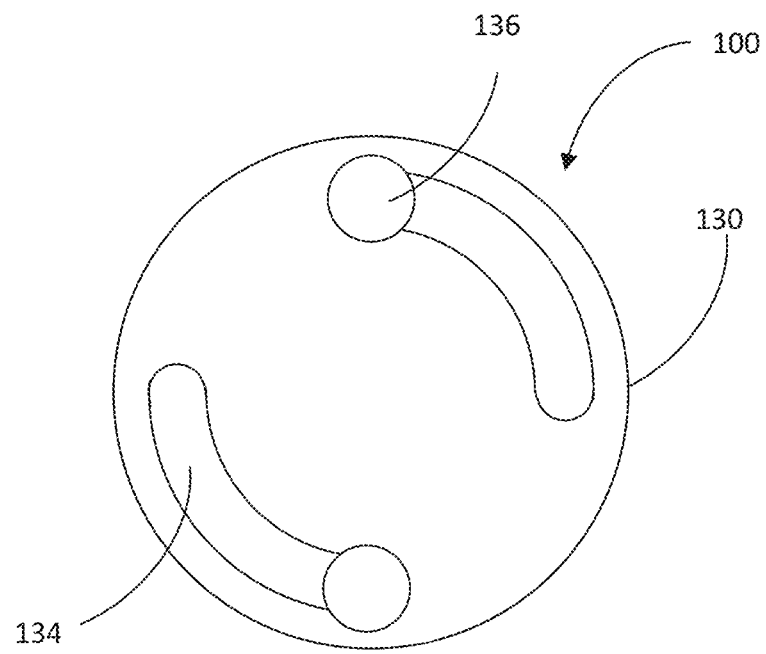
FIG. 8 is a side schematic view of a tunable dynamic vibration absorber according to some embodiments.

Additionally, in an aspect of an embodiment, the mounting structure 130 may not be limited to predefined discrete axial positions. For example, reference is now made to FIG. 8, which is a side schematic view of a tunable dynamic vibration absorber according to some embodiments. As illustrated, the mounting structure 130 includes mounting structures 134 that are arcuate slots that provide a fully adjustable axial position of the TVA 100 over the angular range corresponding to the slots. Similar to FIG. 7, one or more removable fastening components 136 may be used to attach the mounting structure 130 to the frame of the vibratory compactor in a specific radial position relative to the frame of the vibratory compactor.

Figure 9:
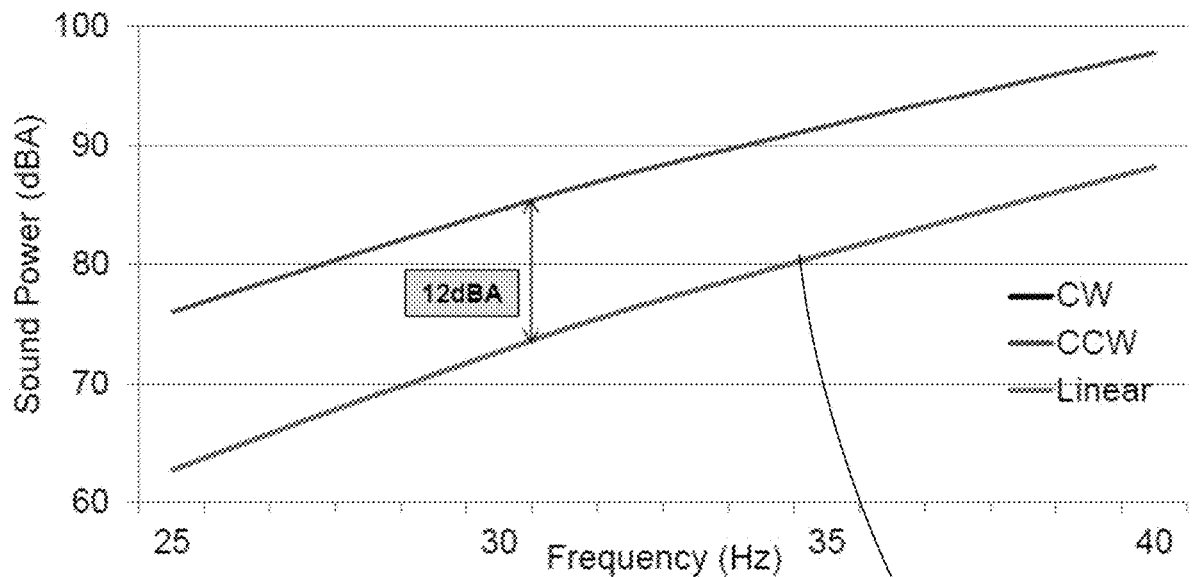
FIG. 9 is a plot illustrating experimental data corresponding to sound power reduction over a range of frequencies using a tunable vibration absorber according to some embodiments.

Brief reference is now made to FIG. 9, which is a plot illustrating experimental data corresponding to sound power reduction over a range of frequencies using a tunable vibration absorber according to some embodiments. As illustrated, the reduced sound power data 201 corresponding to the use of a TVA 100 may be about 12 dBA across a 25 to 40 Hz frequency range. Aspects according to FIG. 9 may be directed to compactors that include a single drum. However, this is non-limiting as embodiments herein may be application to compactors including two or more drums.

Figure 10:
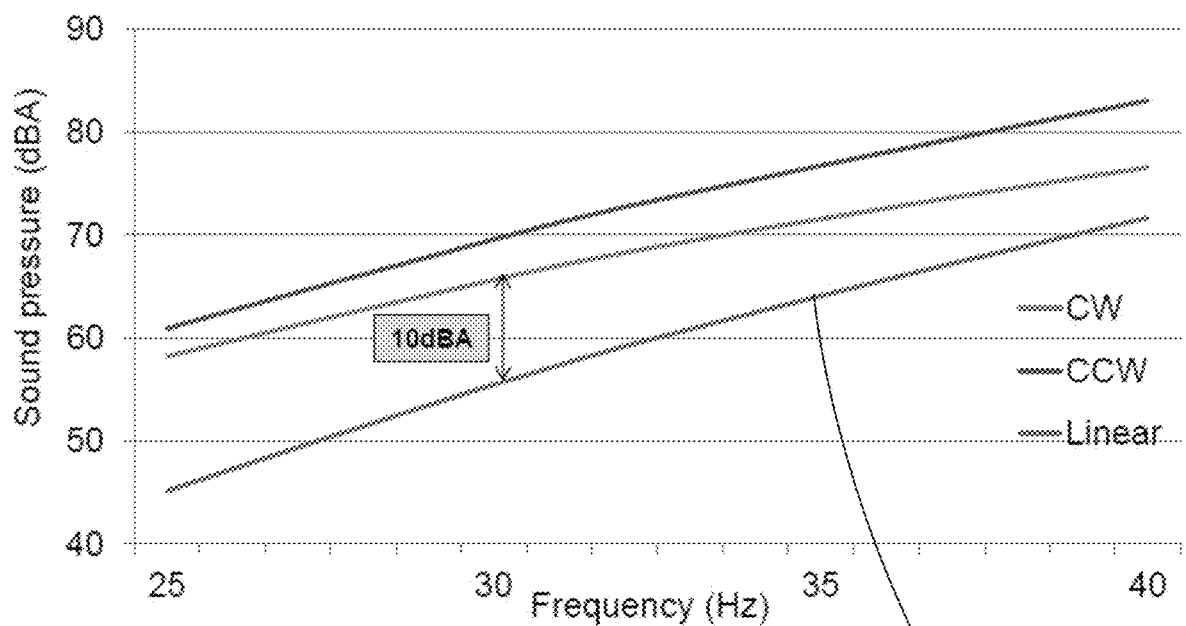
FIG. 10 is a plot illustrating experimental data corresponding to sound pressure reduction at the operator's ear over a range of frequencies using a tunable vibration absorber according to some embodiments.

Brief reference is now made to FIG. 10 is a plot illustrating experimental data corresponding to sound pressure reduction at the driver's ear over a range of frequencies using a tunable vibration absorber according to some embodiments. As illustrated, the reduced sound pressure data 202 corresponding to the use of a TVA 100 may be about 10 dBA across a 25 to 40 Hz frequency range.

Figure 11:
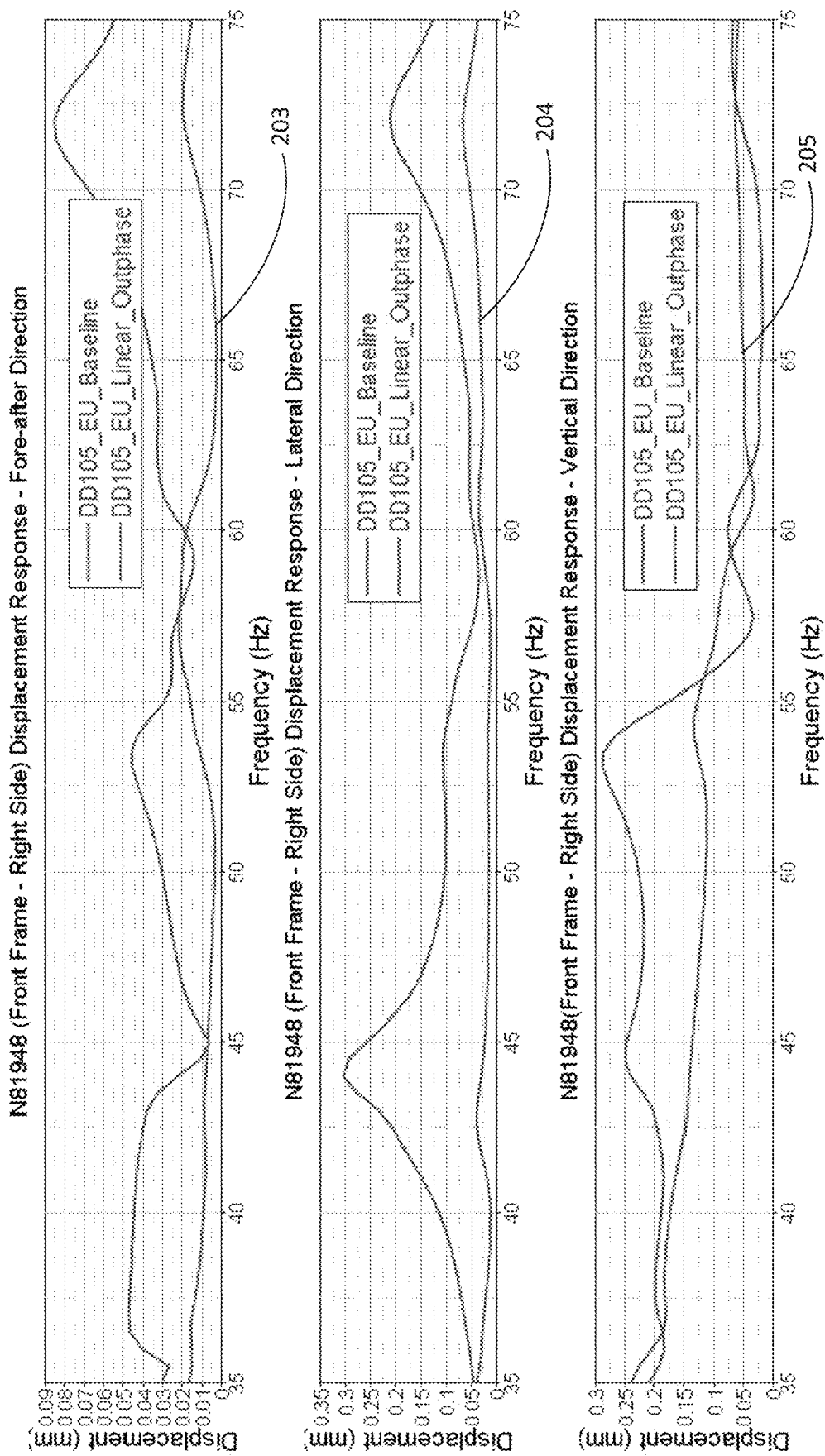
FIG. 11 illustrates three plots illustrating vibration displacement response data corresponding to the fore-after, lateral and vertical directions, respectively for the front frame right side, according to some embodiments.

Reference is now made to FIG. 11, which illustrates three plots illustrating vibration displacement response data corresponding to the fore-after, lateral and vertical directions, respectively for the front frame right side of a double drum compactor, according to some embodiments. As illustrated, the experimental data 203 demonstrates a reduction in the displacement of the front frame right side in the fore-after direction at all frequencies in which the displacement was greater than about 0.03 mm. For the front frame right side in the lateral direction, the experimental data 204 demonstrates a reduction in the displacement at all frequencies. Regarding the front frame right side vertical direction, the experimental data 205 demonstrates a reduction in displacement at frequencies in a range of about 42 Hz to about 55 Hz.

Figure 12:
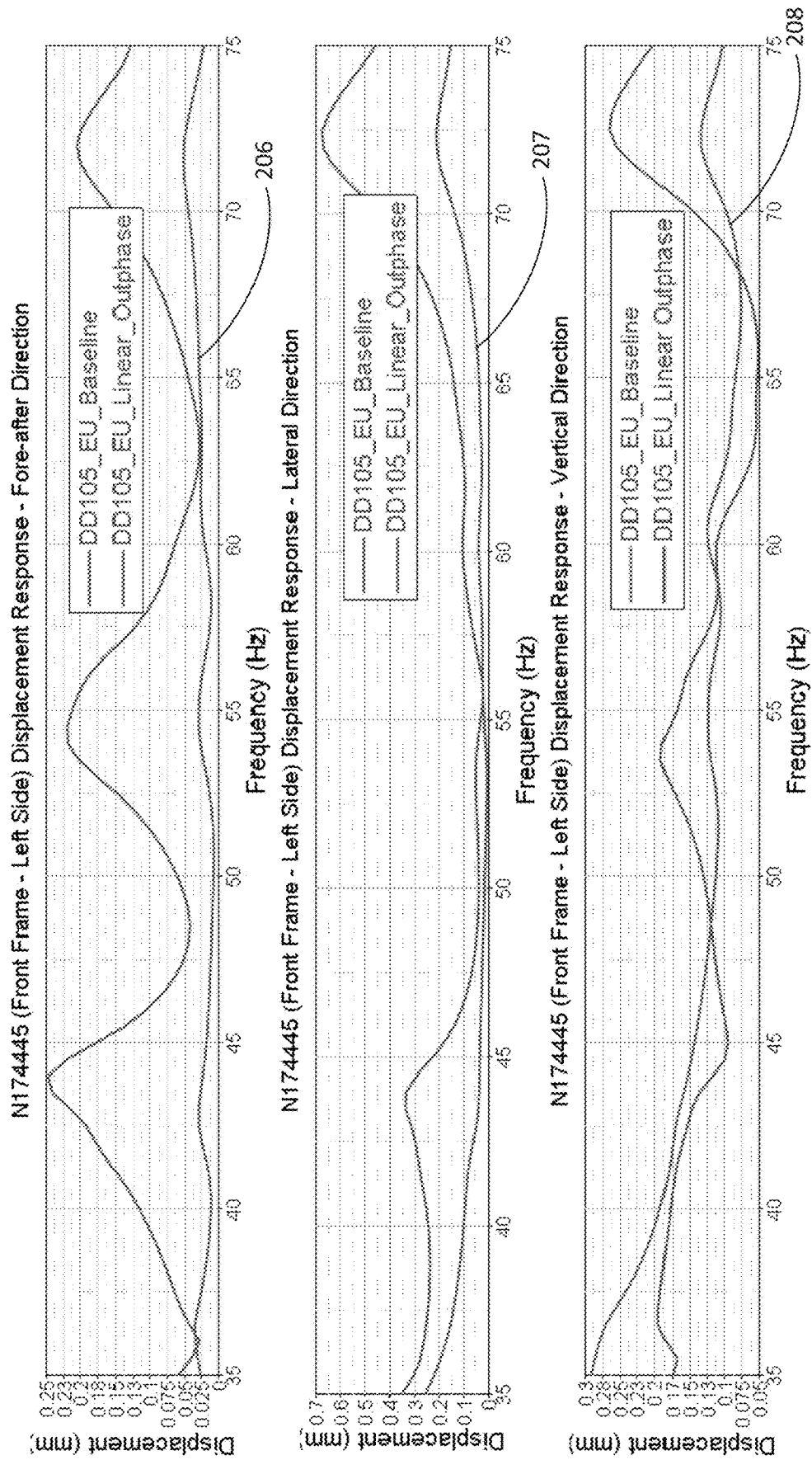
FIG. 12 illustrates three plots illustrating vibration displacement response data corresponding to the fore-after, lateral and vertical directions, respectively for the front frame left side, according to some embodiments.

Reference is now made to FIG. 12, which illustrates three plots illustrating vibration displacement response data corresponding to the fore-after, lateral and vertical directions, respectively for the front frame left side, according to some embodiments. As illustrated, the experimental data 206 demonstrates a reduction in the displacement of the front frame left side in the fore-after direction at all frequencies in which the displacement was greater than about 0.05 mm. For the front frame left side in the lateral direction, the experimental data 207 demonstrates a reduction in the displacement at all frequencies in which the displacement was greater than about 0.1 mm. Regarding the front frame left side vertical direction, the experimental data 208 demonstrates a reduction in displacement at frequencies in ranges of about 50 Hz to about 57 Hz and about 69 Hz to about 75 Hz.

Figure 13:
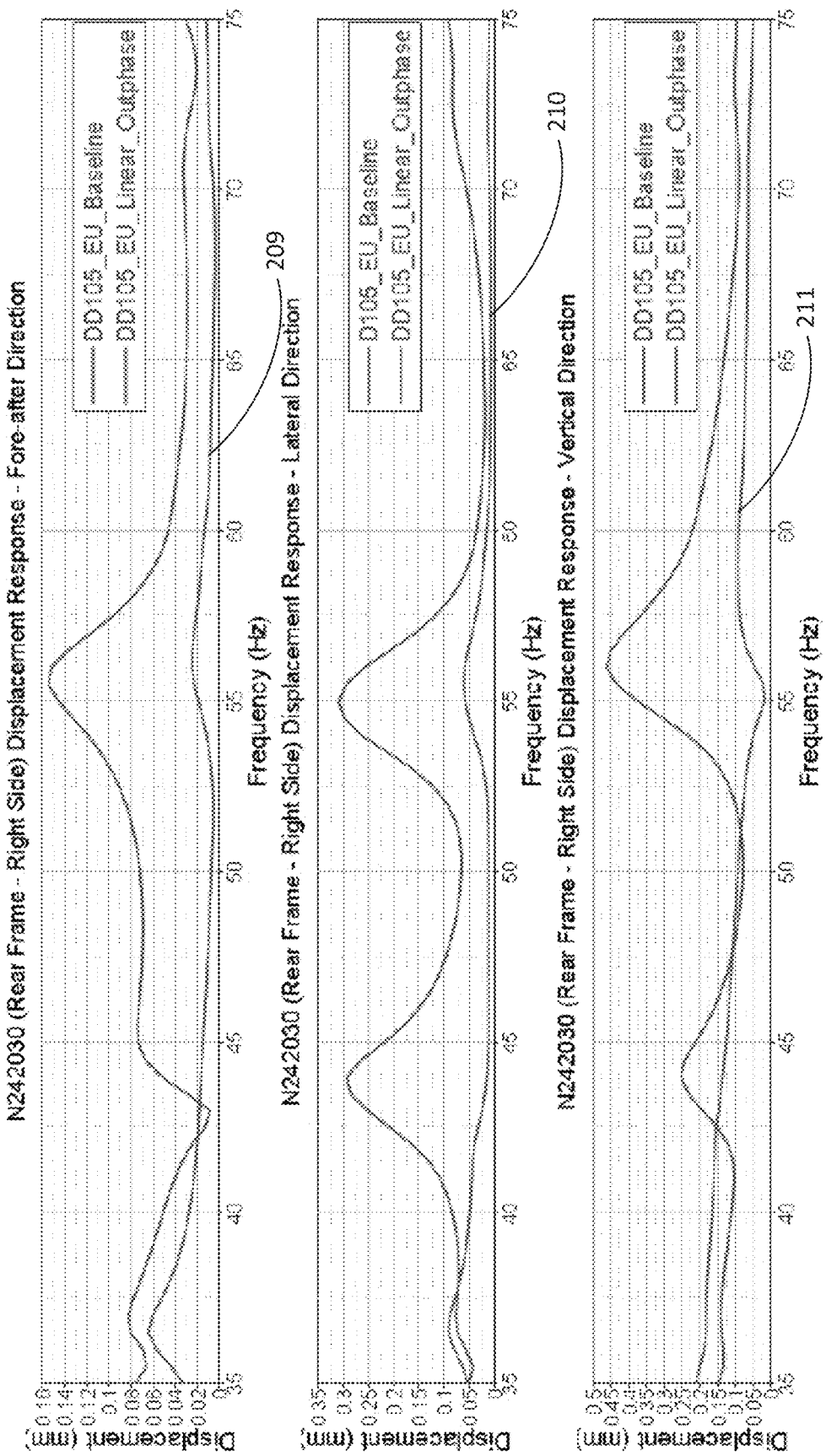
FIG. 13 illustrates three plots illustrating vibration displacement response data corresponding to the fore-after, lateral and vertical directions, respectively for the rear frame right side, according to some embodiments.

Reference is now made to FIG. 13, which illustrates three plots illustrating vibration displacement response data corresponding to the fore-after, lateral and vertical directions, respectively for the rear frame right side, according to some embodiments. As illustrated, the experimental data 209 demonstrates a reduction in the displacement of the rear frame right side in the fore-after direction at all frequencies in which the displacement was greater than about 0.02 mm. For the rear frame right side in the lateral direction, the experimental data 210 demonstrates a reduction in the displacement at all frequencies in which the displacement was greater than about 0.1 mm. Regarding the rear frame right side vertical direction, the experimental data 211 demonstrates a reduction in the displacement at all frequencies in which the displacement was greater than about 0.15 mm.

Figure 14:
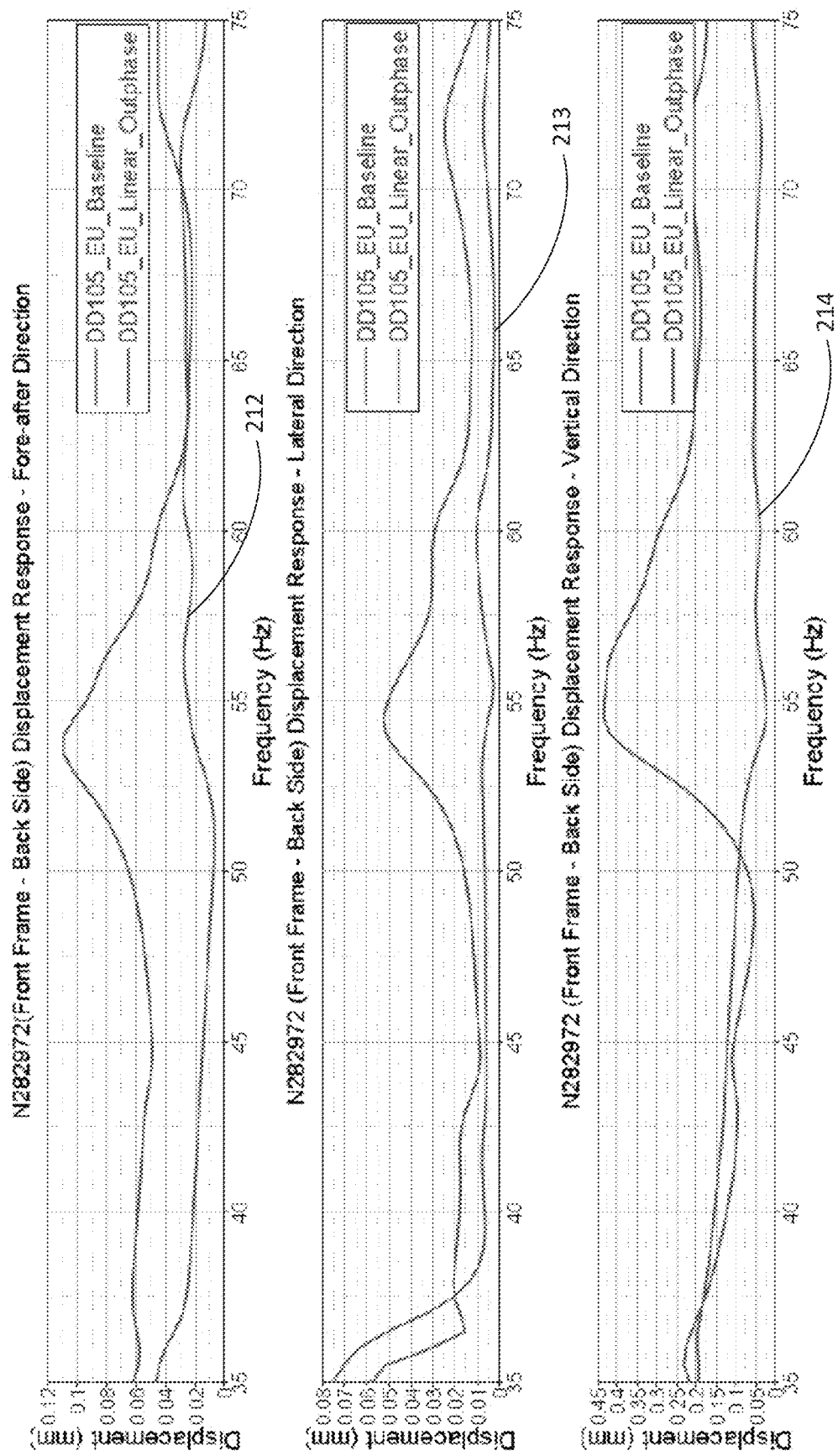
FIG. 14 illustrates three plots illustrating vibration displacement response data corresponding to the fore-after, lateral and vertical directions, respectively for the front frame back side, according to some embodiments.

Reference is now made to FIG. 14, which illustrates three plots illustrating vibration displacement response data corresponding to the fore-after, lateral and vertical directions, respectively for the front frame back side, according to some embodiments. As illustrated, the experimental data 212 demonstrates a reduction in the displacement of the front frame back side in the fore-after direction at all frequencies in which the displacement was greater than about 0.04 mm. For the front frame back side in the lateral direction, the experimental data 213 demonstrates a reduction in the displacement at all frequencies in which the displacement was greater than about 0.015 mm. Regarding the front frame back side vertical direction, the experimental data 214 demonstrates a reduction in displacement at frequencies greater than about 51 Hz.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings herein. It will also be apparent to those of ordinary skill in the art that the above-described embodiments may be combined in whole or in part to create additional embodiments within the scope and teachings herein. Thus, although specific embodiments are described herein for illustrative purposes, various equivalent modifications are possible within the scope of the present disclosure, as those skilled in the relevant art will recognize. Accordingly, the scope of the present disclosure is determined from the appended claims and equivalents thereof.

The invention claimed is:

1. A tunable vibration absorber, TVA, for a vibratory compactor machine comprising:
   a frame mounting structure that is configured to mechanically interface with a frame of the vibratory compactor machine to provide a fixed attachment of the TVA to the frame of the vibratory compactor machine;
   a TVA carrier that extends from the frame mounting structure into an interior portion of a drum of the vibratory compactor machine;
   a resilient element that includes a first portion that is fixedly attached relative to the TVA carrier and a second portion that includes a degree of freedom of movement relative to the TVA carrier; and
   a mass that is attached to the second portion of the resilient element and that includes the degree of freedom of movement relative to the TVA carrier,
   wherein the TVA carrier includes an inner cavity that is configured to receive a portion of a vibrating component that is configured to generate vibration of the drum, and
   wherein the TVA carrier is substantially concentric relative to the drum and wherein the mass is laterally positioned at a center of an axis of the drum between a first end of the drum and a second end of the drum.

2. The apparatus of claim 1, wherein the frame mounting structure comprises a removable fastening component that is configured to attach the frame mounting structure to the frame of the vibratory compactor in one of a plurality of radially distinct positions relative to the frame of the vibratory compactor.

3. The apparatus of claim 1, wherein a direction of vibration absorbed corresponds to a direction of the degree of freedom of movement of the mass.

4. The apparatus of claim 1, wherein the resilient element comprises a leaf spring, wherein the second portion of the resilient element comprises a plurality of ends of the leaf spring that are opposite one another, wherein the mass comprises first mass that is attached to a first one of the plurality of ends of the leaf spring and a second mass that is attached at a second one of the plurality of ends of the leaf spring.

5. The apparatus of claim 4, wherein the first portion of the resilient element comprises a center portion of the leaf spring that is between the plurality of ends of the leaf spring, and wherein the leaf spring is attached to the TVA carrier at the center portion of the leaf spring.

6. The apparatus of claim 4, wherein the TVA carrier comprises an elongated portion that is configured to extend into the interior portion of the drum of the vibratory compactor machine and that includes an elongated cavity therein, and wherein the first portion of the resilient element is attached relative to the TVA carrier within the elongated cavity.

7. The apparatus of claim 1, further comprising a TVA housing that is attached to the TVA carrier to define an interior space that includes the resilient element and mass.

8. The apparatus of claim 7, wherein the resilient element comprises a coil spring, and wherein the mass is configured to move within the interior space based on the degree of freedom of movement relative to the TVA carrier.

9. The apparatus of claim 7, further comprising a fluidic medium that is within the interior space and that dampens movement of the mass within the interior space.

10. The apparatus of claim 9, wherein a viscosity of the fluidic medium corresponds to a natural frequency of the mass and resilient element that corresponds to an eccentric speed of the vibratory compactor machine.

11. The apparatus of claim 9, wherein the fluidic medium comprises an electrorheological fluid that is configured to change viscosity in response to an electric field.

12. The apparatus of claim 9, further comprising a fluid reservoir that is configured to store at least a portion of the fluidic medium wherein a natural frequency of the TVA is adjustable based on an amount of the fluidic medium in the interior of the TVA housing.

13. The apparatus of claim 1, wherein the frame mounting structure is configured to support the TVA carrier at a proximal end, the apparatus further comprising a bearing that is configured to support the TVA carrier at a distal end that is opposite the proximal end.

14. The apparatus of claim 1, wherein the resilient element and the mass comprise a natural frequency that corresponds to an eccentric speed of the vibratory compactor machine.

15. The apparatus of claim 1, wherein a stiffness of the resilient element and a size of the mass correspond to dominant target frequencies.

16. A tunable vibration absorber, TVA, for a vibratory compactor machine comprising:
a frame mounting structure that is configured to mechanically interface with a frame of the vibratory compactor machine to provide a fixed attachment of the TVA to the frame of the vibratory compactor machine;
a TVA carrier that extends from the frame mounting structure into an interior portion of a drum of the vibratory compactor machine;
a resilient element that includes a first portion that is fixedly attached relative to the TVA carrier and a second portion that includes a degree of freedom of movement relative to the TVA carrier; and
a mass that is attached to the second portion of the resilient element and that includes the degree of freedom of movement relative to the TVA carrier,
wherein the resilient element comprises a leaf spring, wherein the second portion of the resilient element comprises a plurality of ends of the leaf spring that are opposite one another, wherein the mass comprises first mass that is attached to a first one of the plurality of ends of the leaf spring and a second mass that is attached at a second one of the plurality of ends of the leaf spring.

17. The apparatus of claim 1, wherein the first portion of the resilient element is positioned in the interior portion of the drum, and
wherein the mass is positioned in the interior of the drum.

18. A tunable vibration absorber, TVA, for a vibratory compactor machine comprising:
a frame mounting structure that is configured to mechanically interface with a frame of the vibratory compactor machine to provide a fixed attachment of the TVA to the frame of the vibratory compactor machine;
a TVA carrier that extends from the frame mounting structure into an interior portion of a drum of the vibratory compactor machine;
a resilient element that includes a first portion that is fixedly attached relative to the TVA carrier and a second portion that includes a degree of freedom of movement relative to the TVA carrier; and
a mass that is attached to the second portion of the resilient element and that includes the degree of freedom of movement relative to the TVA carrier,
wherein the TVA carrier includes an inner cavity that is configured to receive a portion of a vibrating component that is configured to generate vibration of the drum,
wherein the first portion of the resilient element is positioned in the interior portion of the drum, and
wherein the mass is positioned in the interior of the drum.

* * * * *